(No Model.) J. O. BRINKERHOFF & M. E. SMITH.
ELECTRIC BATTERY.
No. 453,898. Patented June 9, 1891.
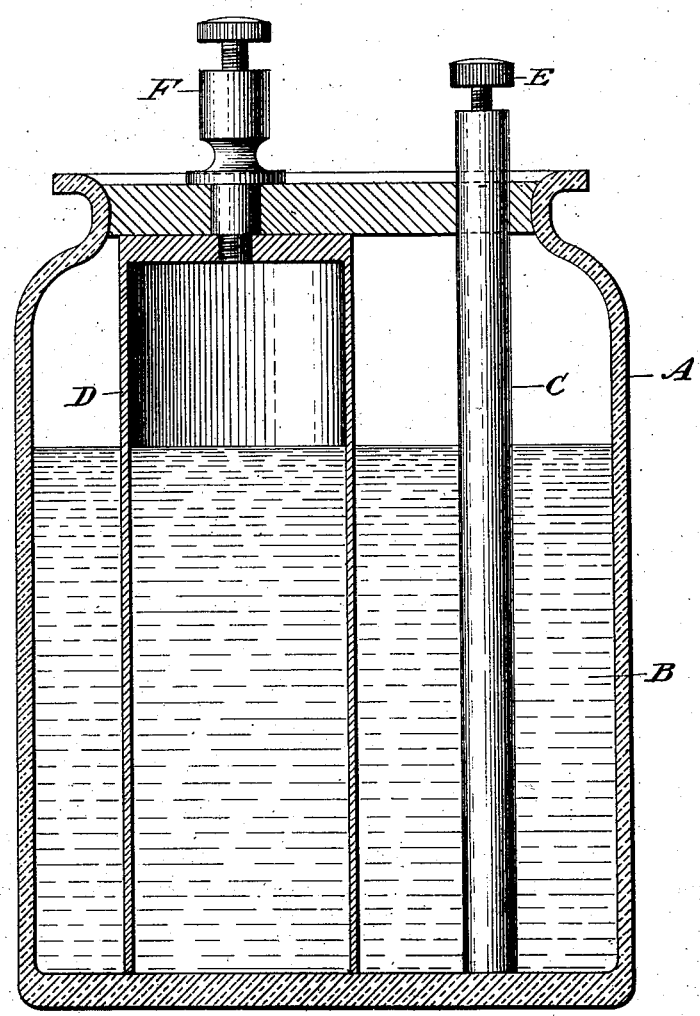
WITNESSES:
INVENTOR:
J. O. Brinkerhoff
BY M. E. Smith
Munn & Co.
ATTORNEYS

United States Patent Office.

JACOB O. BRINKERHOFF, OF HACKENSACK, AND MILTON E. SMITH, OF RUTHERFORD, NEW JERSEY.

ELECTRIC BATTERY.

SPECIFICATION forming part of Letters Patent No. 453,898, dated June 9, 1891.

Application filed November 26, 1890. Serial No. 372,668. (No model.)

*To all whom it may concern:*

Be it known that we, JACOB O. BRINKERHOFF, of Hackensack, and MILTON E. SMITH, of Rutherford, in the county of Bergen and State of New Jersey, have invented new and useful Improvements in Electric Batteries, of which the following is a full, clear, and exact description.

The object of the invention is to provide certain new and useful improvements in electric batteries whereby the electro-motive force of the battery is greatly increased and the electricity produced and passing in a current is uniform in quantity and well maintained, so that the life of the battery, with an increased strength of current, is considerably longer than the batteries heretofore constructed.

The invention consists of an exciting-fluid formed of antimonious chloride and an alkaline chloride.

The invention also consists in certain parts and details and combinations of the same, as will be described hereinafter, and then pointed out in the claims.

Reference is to be had to the accompanying drawing, forming a part of this specification, in which the figure is a sectional side elevation of the improvement.

The improved battery is provided with the usual jar A, containing the exciting-fluid B, in which extend the electrodes C and D, carrying at their upper ends the usual binding-posts E and F, respectively. The electrode C is preferably made of the usual zinc rod, while the electrode D is formed of a copper cylinder closed at its upper end. The exciting-fluid is in contact with the inner as well as the outer surface of the cylinder, as plainly shown in the drawing, so that both faces are acted upon by the exciting-fluid and the efficiency of the battery is greatly increased. When the antimonious chloride is used singly as the exciting-fluid for one or both electrodes, then a very strong electric current is produced for a great length of time, and when added to a well-known exciting-fluid—such as sal-ammoniac, for instance—then the power of the said exciting-fluid to produce a current of electricity is greatly increased.

The exciting-fluid of the character described may be used both in liquid or solid form and applied to one or both electrodes, it being understood that in the common jar-battery shown the electrodes extend into the antimonious chloride, while in the porous-cup batteries only one electrode is immersed in the substance.

Having thus described our invention, what we claim as new, and desire to secure by Letters Patent, is—

1. An exciting-fluid for electric batteries, consisting of antimonious chloride and an alkaline chloride, substantially as described.

2. In an electric battery, the combination, with an exciting-fluid formed of a mixture of antimonious chloride and alkaline chloride, of one or both electrodes engaging the said exciting-fluid, substantially as described.

3. In an electric battery, the combination, with a copper cylinder forming one of the electrodes, of an exciting-fluid formed of antimonious chloride and in contact with the inner and outer surfaces of the said cylinder, substantially as described.

JACOB O. BRINKERHOFF.
MILTON E. SMITH.

Witnesses:
WM. M. SMITH,
J. M. R. WILLIAMS.